United States Patent [19]
Bonnett

[11] Patent Number: 5,020,846
[45] Date of Patent: Jun. 4, 1991

[54] REINFORCING INSERT FOR CONVERTIBLE VEHICLE

[75] Inventor: Roy E. Bonnett, Birmingham, Mich.

[73] Assignee: Ford Motor Company, Dearborn, Mich.

[21] Appl. No.: 358,307

[22] Filed: May 30, 1989

[51] Int. Cl.$^5$ .............................................. B62D 25/00
[52] U.S. Cl. ..................... 296/186; 296/39.1; 296/193; 296/203; 296/901
[58] Field of Search .............. 296/39.1, 39.2, 37.6, 296/37.14, 186, 193, 196, 197, 203, 204, 901; 29/401.1

[56] References Cited

U.S. PATENT DOCUMENTS

| | | | |
|---|---|---|---|
| 2,637,592 | 5/1953 | Karlby | 296/193 |
| 2,788,223 | 4/1957 | Mersheimer et al. | 296/204 X |
| 3,022,105 | 2/1962 | Tjaarda | 296/196 |
| 3,331,627 | 7/1967 | Schröder | 296/901 X |
| 3,415,568 | 12/1968 | Gugelot et al. | 296/901 X |
| 3,550,948 | 12/1970 | Thompson, Jr. | 296/901 X |
| 3,811,721 | 5/1974 | Bolesky | 296/193 |
| 4,457,555 | 7/1984 | Draper | 296/186 |
| 4,491,362 | 1/1985 | Kennedy | 296/901 X |
| 4,514,891 | 5/1985 | Draper | 29/401.1 |
| 4,570,321 | 2/1986 | Draper | 29/401.1 |
| 4,682,809 | 7/1987 | Huss | 296/901 X |
| 4,730,870 | 3/1988 | DeRees | 296/197 |
| 4,733,898 | 3/1988 | Williams | 296/37.6 X |

FOREIGN PATENT DOCUMENTS 858419 12/1970 Canada .............................. 296/901

Primary Examiner—Dennis H. Pedder
Attorney, Agent, or Firm—James A. Kushman; Daniel M. Stock; Keith L. Zerschling

[57] ABSTRACT

A reinforcing insert (16) for a vehicle body (10) has a shell-like construction positionable within the vehicle occupant compartment (14) and includes a front end (54) having a foot portion (56) as well as including a rear end (58) of an upwardly and forwardly opening shape. The reinforcing insert also has an intermediate portion (60) extending between the front and rear ends (54, 58) and having a floor (62) with side edges (64) for positioning adjacent side door openings (34) of the vehicle. Resin transfer molding is preferably utilized to manufacture the reinforcing insert (16) as a pair of insert members (66) with a central connection (68) extending in a longitudinal direction with respect to the convertible vehicle. Reinforcing ribs (72) of the insert members (66) provide locations of connections to the convertible vehicle. Rear quarter panels (86) of the insert are preferably connected by a trunk ceiling portion (96) and also have holes (98, 100) for mounting the convertible soft top frame (48) and rear quarter windows (44). Adhesive bond connections preferably connect the reinforcing insert (16) to the convertible vehicle at all points of contact as well as connecting the insert members (66) to each other.

16 Claims, 2 Drawing Sheets

REINFORCING INSERT FOR CONVERTIBLE VEHICLE

TECHNICAL FIELD

This invention relates to a reinforcing insert for a convertible type vehicle to provide strengthening of the vehicle body.

BACKGROUND ART

Convertible type vehicles unlike sedan and hardtop vehicles do not have any rigid roof for providing strengthening of the vehicle body in cooperation with the vehicle floor pan. As such, the vehicle body floor pan has to be sufficiently strong to carry the forces that are normally carried by the roof of sedan and hardtop type vehicles.

Relatively recent production convertible type vehicles are made with the same vehicle body floor pan as similar sedan and hardtop type vehicles for purposes of economy. The roof of the vehicle is either removed or the vehicle is constructed with a "dummy" roof that can be recirculated through the vehicle body assembly line to provide support between the vehicle windshield header and the rear deck panel of the vehicle during the vehicle body assembly operation. Since the same floor pan is utilized as with sedan and hardtop type vehicles, reinforcement of the floor pan is necessary in order to have the requisite strength for carrying the forces that the roof would otherwise carry.

The David L. Draper U.S. Pat. Nos. 4,457,555; 4,514,891; and 4,570,321 disclose reinforcement of convertible type vehicle body floor pans by a stamped metal center member of an inverted U shape secured to the vehicle body along the central transmission tunnel. A forward section secured to a front end of the center member is attached to the vehicle floor pan at its front end, while a rearward section secured to a rear end of the center member is attached to the vehicle floor pan at its rear end. Between the forward and rearward sections, the center member extends only along the central transmission tunnel of the floor pan and thus does not provide any direct support at lateral extremities of the floor pan adjacent the side door openings of the associated convertible vehicle.

DISCLOSURE OF INVENTION

This invention provides an improved reinforcing insert for a convertible type vehicle including an occupant compartment having front and rear extremities and side door openings between these extremities. The reinforcing insert is molded from plastic and has a shell-like construction received within the occupant compartment. The reinforcing insert has a front end including a foot portion and also has a rear end of an upwardly and forwardly opening shape. An intermediate portion of the insert includes a floor that extends between its front and rear ends and has side edges for positioning adjacent the side door openings of the vehicle.

Provision of the reinforcing insert permits the convertible vehicle to utilize a vehicle body construction that would otherwise be usable only with a sedan or hardtop vehicle reinforced by a hard roof that is not present with a soft top convertible vehicle.

In the preferred construction, the reinforcing insert is made by resin transfer molding wherein glass fibers are initially inserted into a mold prior to closing whereupon injection of synthetic resin into the mold provides the molded plastic insert that reinforces the convertible vehicle. This molded plastic reinforcing insert is most preferably constructed as a pair of insert members having a central connection to each other along a longitudinal direction with respect to the vehicle. Such a construction facilitates the molding and also facilitates assembly of the insert within the occupant compartment of the convertible vehicle. In addition to the longitudinally extending central connection, the reinforcing insert also preferably includes ribs for providing strength and connection locations of the reinforcing insert to the convertible vehicle. These ribs, like the central connection, are disclosed as extending longitudinally with respect to the vehicle. However, it should be appreciated that the ribs can also extend laterally with respect to the vehicle as well as longitudinally. Likewise, other formations can also be utilized to provide connection locations of the insert to the vehicle with the rest of the insert spaced from the vehicle.

In its preferred construction, the reinforcing insert also includes rear quarter panels that are located to the rear of the side door openings of the convertible vehicle extending upwardly from the floor. These rear quarter panels of the reinforcing insert have upper edges extending rearwardly from the side door openings and secured to the convertible vehicle to provide reinforcement. A trunk ceiling portion of the reinforcing insert extends between the rear quarter panels thereof to define a ceiling of a trunk storage compartment of the convertible vehicle.

The rear quarter panels of the preferred construction of the reinforcing insert also preferably include holes that provide a preferred means for mounting a soft top frame of the convertible vehicle and for mounting rear quarter windows thereof at locations to the rear of the side door openings.

Adhesive bonds are preferably provided to secure the ribs, the floor side edges, and the upper edges of the rear quarter panels to the convertible vehicle as well as securing the insert members to each other.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
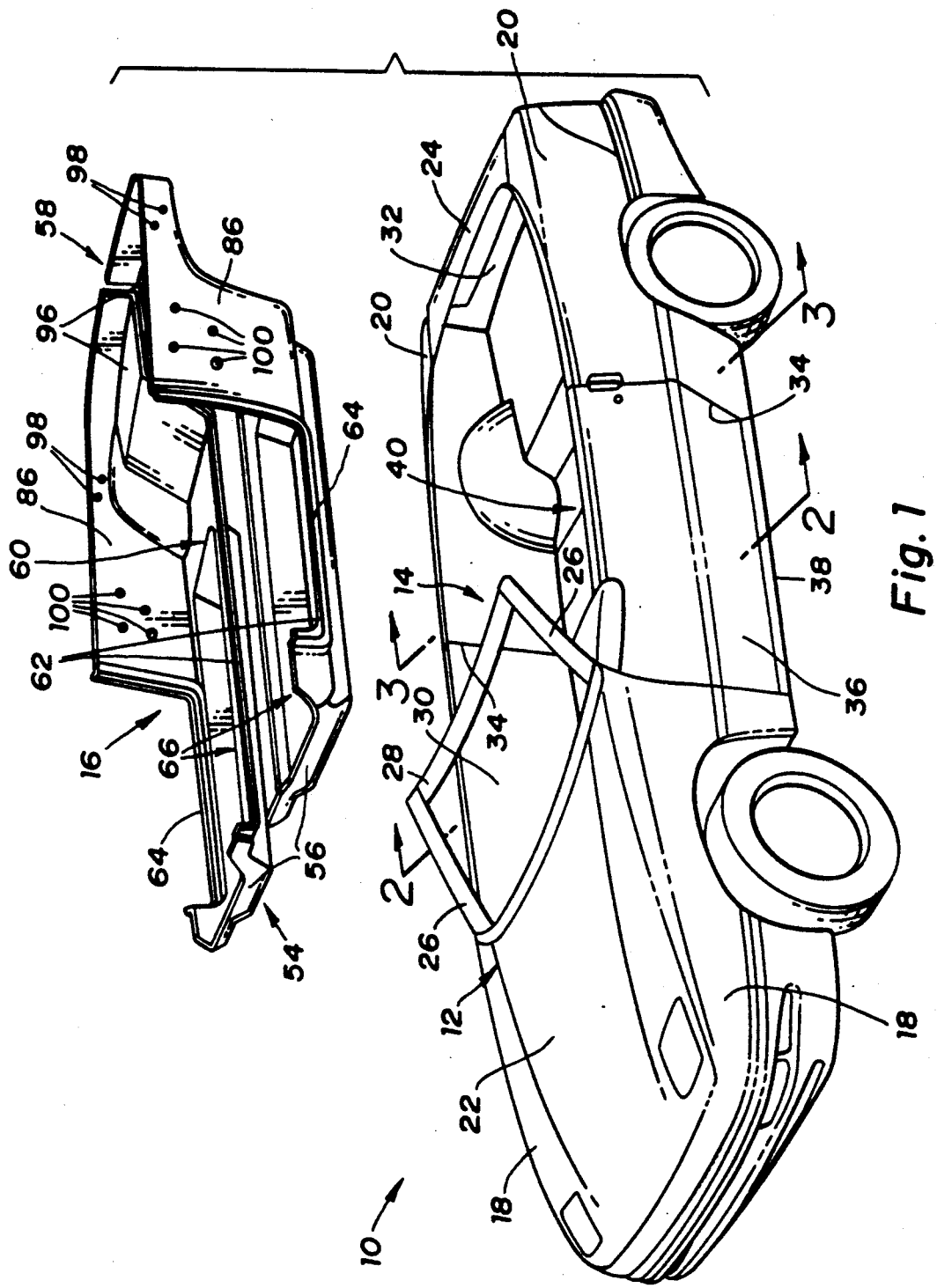
FIG. 1 is an exploded perspective view of a convertible vehicle and a reinforcing insert used therewith according to the present invention.

With reference to FIG. 1 of the drawings, a convertible vehicle generally indicated by 10 includes a vehicle body 12 having an occupant compartment 14 into which a reinforcing insert 16 according to the present invention is inserted and assembled as is hereinafter more fully described. The vehicle body 12 of the convertible vehicle has a conventional construction including left and right front and rear quarter panels 18 and 20 which are respectively located on opposite sides of an engine compartment panel 22 and a rear trunk panel 24. At the rear extremities of the front quarter panels 18 and the engine compartment panel 22, the vehicle body includes laterally spaced windshield pillars 26 that project upwardly and are connected by a windshield header 28 to cooperate therewith in extending around the windshield 30 in a conventional fashion adjacent the front end of occupant compartment 14. Adjacent a rear end of the occupant compartment 14, the trunk panel 24 is located above a trunk storage compartment 32 and is supported in a conventional manner for movement between open and closed positions. Intermediate the front and rear quarter panels 18 and 20, each side of the vehicle has a side door opening 34 that is opened and closed by an associated side door 36. A rocker structure 38 defines the lower extremity of the side door opening 34 and extends between the front and rear quarter panels 18 and 20 on opposite sides of the vehicle floor pan 40 which is also illustrated in FIGS. 2 and 3.

Figure 4:
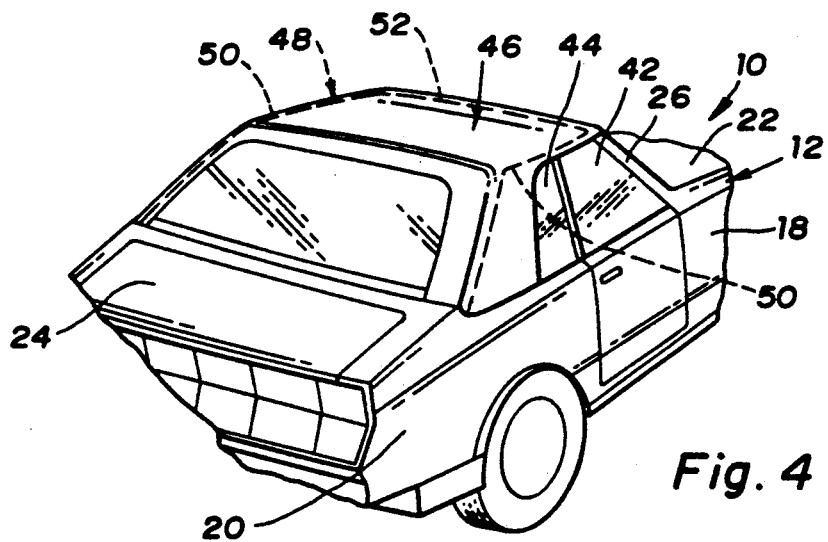
FIG. 4 is a partial perspective view taken from the side and the rear at an upper location with respect to the convertible vehicle to illustrate the closed condition of the soft top thereof covering the occupant compartment in which the reinforcing insert is assembled.

As shown in FIG. 4, the vehicle 10 includes conventional side door windows 42 and rear quarter windows 44 that are mounted by suitable unshown regulators for movement between lower open positions and the upper closed positions illustrated. A soft top 46 of the vehicle has a frame 48 that moves the soft top between the closed position shown and an unshown storage position that opens the occupant compartment in accordance with conventional movement of convertible tops. The frame 48 includes a pair of side rails 50 having rear ends that are supported for movement on the vehicle and having front ends that are connected by a convertible top header 52 that is supported by the windshield header 28 shown in FIG. 1 when the convertible top is in the closed position illustrated in FIG. 4.

With reference to FIG. 1, the reinforcing insert 16 is molded from plastic and is most preferably provided by resin transfer molding. Such resin transfer moldings are made by a plastic preform and/or glass fibers that are either woven into cloth or sprayed as a mat for insertion into the open mold prior to mold closing, whereupon transfer of liquid synthetic resin into the closed mold and subsequent cooling provides the resin transfer molding. The plastic molded reinforcing insert has a front end 54 including a foot portion 56 and also has a rear end 58 of an upwardly and forwardly opening shape. An intermediate portion 60 of the insert 16 includes a floor 62 that extends between the front and rear ends and has side edges 64 for positioning adjacent the side door openings 34 in the assembled condition.

Figure 2:
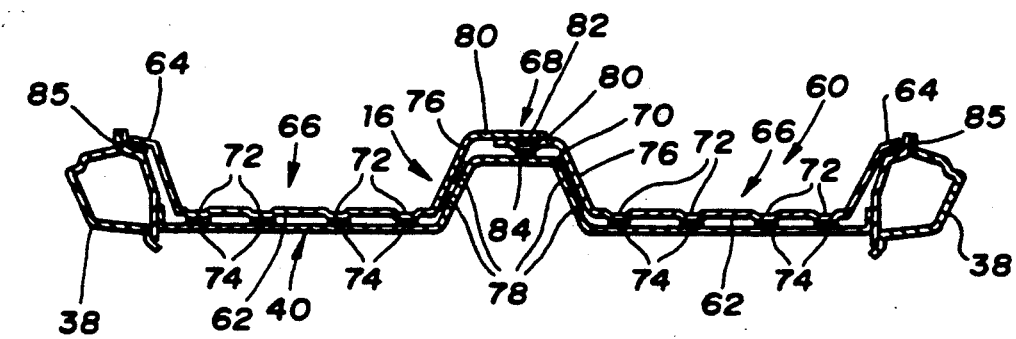
FIG. 2 is a cross-sectional view through the convertible vehicle with the reinforcing insert assembled thereto and is taken generally along the direction of line 2—2 in FIG. 1.
Figure 3:
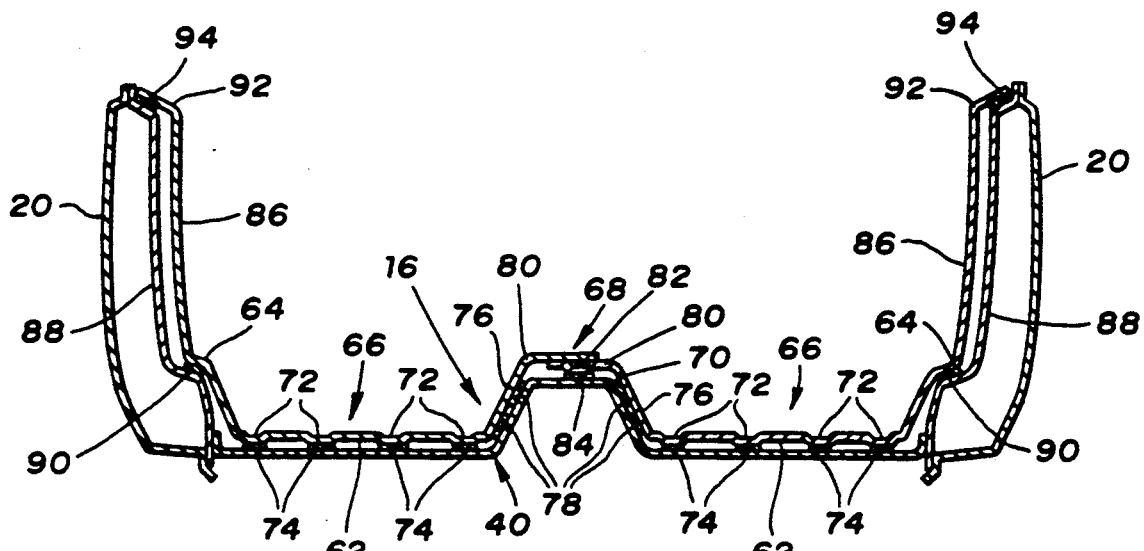
FIG. 3 is also a cross-sectional view through the convertible vehicle with the reinforcing insert assembled thereto and is taken along the direction of line 3—3 in FIG. 1.

With combined reference to FIGS. 1, 2 and 3, the reinforcing insert 16 preferably includes a pair of insert members 66 having a central connection 68 to each other along a longitudinal direction with respect to the convertible vehicle. More specifically, the central connection 68 is located along the vehicle transmission tunnel 70 of the floor pan 40 at a laterally intermediate location with respect to the laterally spaced rocker structures 38 shown in FIG. 2 and the laterally spaced rear quarter panels 20 shown in FIG. 3. It should, of course, be appreciated that the reinforcing insert can be used with front wheel drive convertible vehicles, that do not have the type of transmission tunnel shown, as well as being used with rear wheel drive cars having such transmission tunnels.

As best illustrated in FIGS. 2 and 3, the reinforcing insert 16 includes ribs 72 for providing strength and connection locations of the reinforcing insert to the convertible vehicle. These reinforcing ribs 72 preferably extend longitudinally with respect to the vehicle and project in a downward direction as illustrated in FIGS. 2 and 3 with adhesive bonds 74 providing connections thereof to the floor pan 40. Each insert member 66 has an inclined portion 76 that extends upwardly at the transmission tunnel 70 and has adhesive bonds 78 for providing connections to the transmission tunnel. At the upper ends of the inclined portions 76, each insert has a horizontal portion 80 that overlaps with the horizontal portion of the other insert member with an adhesive bond 82 providing a connection between these portions and an adhesive bond 84 providing connection of the overlapped horizontal portions to the transmission tunnel 70 of floor pan 40.

At the lateral outboard sides of the reinforcing insert adjacent the rocker structures 38 as illustrated in FIG. 2, each insert member 66 has its associated side edge 64 provided with an adhesive bond 85 that provides a connection to the rocker structure 38. Thus, this bonding of the side edges 64 cooperates with the other adhesive bonds to integrate the reinforcing insert 16 as a structural component of the convertible vehicle with which it is utilized.

With combined reference to FIGS. 1 and 3, the reinforcing insert 16 has its rear end 58 provided with rear quarter panels 86 that are located to the rear of the side door openings 36 (FIG. 1) of the convertible vehicle extending upwardly from the floor 62 provided by each insert member. At the lower ends of the rear quarter panels, the floor side edges 64 have adhesive bonds 90 to lower ends of associated rear quarter panel inner members 88. Rear quarter panels 86 of the reinforcing insert also have upper edges 92 that extend rearwardly from the side door openings and have adhesive bonds 94 for providing connection thereof to the upper ends of the adjacent rear quarter panel inner members 88 of the vehicle body.

Any suitable type of adhesive such as polyurethanes and epoxies can be used for the adhesive bonds between the reinforcing insert and the convertible vehicle. Such adhesive bonds are used at all points of contact to provide the reinforcement. Thus the front and rear ends 54 and 58 shown in FIG. 1 also have adhesive bonds at each location of contact with the vehicle. Furthermore, other formations than the illustrated longitudinal ribs can be used to space the rest of the insert from the vehicle as well as providing connection locations for the preferred securement by adhesive bonds. For example, lateral ribs can be utilized as can spot type formations spaced both longitudinally and laterally from each other.

As illustrated in FIG. 1, the reinforcing insert 16 also includes a trunk ceiling portion 96 that extends between the rear quarter panels 86 to define a ceiling for the trunk storage compartment 32 and to also define a tray for storage of the soft top with the occupant compartment open to the environment.

With continuing reference to FIG. 1, holes 98 in the rear quarter panel 86 provide a preferred means for permitting mounting the rear ends of the side rails 50 of the soft top frame 48 shown in FIG. 4. These rear quarter panels 86 of the insert shown in FIG. 1 also include holes 100 that provide a preferred means for permitting mounting the rear quarter windows 44 illustrated in FIG. 4 at the rear of the side door openings 34. Both the frame and window mountings can be either directly on the reinforcing insert or through the insert to the adjacent vehicle surface as may be most suitable for the particular convertible vehicle.

While the best mode for carrying out the invention has been described in detail, those familiar with the art to which this invention relates will recognize various alternative designs an embodiments for practicing the invention as defined by the following claims.

What is claimed is:

1. For use in a convertible type vehicle including an occupant compartment having front and rear extremities and side door openings therebetween and said vehicle including front and rear quarter panels between which the side door openings are located, rear quarter panel inner members spaced inwardly from the rear quarter panels, rocker structures that extend between the front and rear quarter panels and define the lower extremities of the side door openings, side doors that open and close the side door openings, and a floor pan that extends between the front and rear extremities of the occupant compartment and between the rocker structures at the lower extremities of the side door openings, the invention comprising: a reinforcing insert molded from plastic and having a shell-like construction positionable within the occupant compartment; said reinforcing insert having a front end including a foot portion and also having a rear end of an upwardly and forwardly opening shape; said insert also having an intermediate portion including a floor that extends between the front and rear ends thereof and has side edges for positioning adjacent the rocker structures at the lower extremities of the side door openings of the vehicle with the insert floor positioned above the vehicle floor pan; and the rear end of the insert having rear quarter panels securable to the rear quarter panel inner member of the vehicle.

2. A convertible vehicle reinforcing insert as in claim 1 which includes a pair of insert members having a central connection to each other along a longitudinal direction with respect to the convertible vehicle.

3. A convertible vehicle reinforcing insert as in claim 1 which includes ribs for providing strength and connection locations of the reinforcing insert to the convertible vehicle.

4. A convertible vehicle reinforcing insert as in claim 1 whose rear quarter panels have upper edges including connections for providing securement thereof to the rear quarter panel inner members of the vehicle.

5. A convertible vehicle reinforcing insert as in claim 4 further including a trunk ceiling portion that extends between the rear quarter panels to define a trunk storage compartment ceiling.

6. A convertible vehicle reinforcing insert as in claim 4 wherein the rear quarter panels of the insert include means for mounting a soft top frame of the convertible vehicle.

7. A convertible vehicle reinforcing insert as in claim 6 wherein the mounting means comprises holes in the rear quarter panels of the insert.

8. A convertible vehicle reinforcing insert as in claim 4 wherein the rear quarter panels of the insert include means for mounting rear quarter windows of the convertible vehicle to the rear of the side door openings.

9. A convertible vehicle reinforcing insert as in claim 8 wherein the means for mounting the rear quarter windows comprises holes in the rear quarter panels of the insert.

10. A convertible vehicle reinforcing insert as in claim 1 which includes formations that provide locations for connections of the reinforcing insert to the vehicle floor pan.

11. In a convertible type vehicle including an occupant compartment having front and rear extremities and side door openings therebetween and said vehicle including front and rear quarter panels between which the side door openings are located, rear quarter panel inner members spaced inwardly from the rear quarter panels, rocker structures that extend between the front and rear quarter panels and define the lower extremities of the side door openings, side doors that open and close the side door openings, and a floor pan that extends between the front and rear extremities of the occupant compartment and between the rocker structures at the lower extremities of the side door openings, the invention comprising: a reinforcing insert molded from plastic and having a shell-like construction positionable within the occupant compartment; said reinforcing insert having a front end including a foot portion and also having a rear end of an upwardly and forwardly opening shape; and said insert also having an intermediate portion including a floor that extends between the front and rear ends thereof and has side edges for positioning adjacent the rocker structures at the lower extremities of the side door openings of the vehicle with the insert floor positioned above the vehicle floor pan; the rear end of the insert having rear quarter panels securable to the rear quarter panel inner members of the vehicle; and adhesive bond connections that secure the insert to the vehicle.

12. For use in a convertible type vehicle including an occupant compartment having front and rear extremities and side door openings therebetween and said vehicle including front and rear quarter panels between which the side door openings are located, rear quarter panel inner members spaced inwardly from the rear quarter panels, rocker structures that extend between the front and rear quarter panels and define the lower extremities of the side door openings, side doors that open and close the side door openings, and a floor pan that extends between the front and rear extremities of the occupant compartment and between the rocker structures at the lower extremities of the side door openings, the invention comprising: a reinforcing insert molded from plastic as a pair of insert members and having a shell-like construction positionable within the occupant compartment; said reinforcing insert having a front end including a foot portion and also having a rear end of an upwardly and forwardly opening shape; said insert also having an intermediate portion that extends between the front and rear ends and has side edges for positioning adjacent the rockier structures at the lower extremities of the side door openings of the vehicle with the insert floor positioned above the vehicle floor pan; each insert member having a rear quarter panel that is securable to one of the rear quarter panel inner members of the vehicle; and a central connection for connecting the insert members to each other along a longitudinal direction with respect to the convertible vehicle.

13. In a convertible type vehicle including an occupant compartment having front and rear extremities and side door openings therebetween and said vehicle including front and rear quarter panels between which the side door openings are located, rear quarter panel inner members spaced inwardly from the rear quarter panels, rocker structures that extend between the front and rear quarter panels and define the lower extremities of the side door openings, side doors that open and close the side door openings, and a floor pan that extends between the front and rear extremities of the occupant compartment and between the rocker structures at the lower extremities of the side door openings, the invention comprising: a reinforcing insert molded from plastic as a pair of insert members and having a shell-like construction positionable within the occupant compartment; said reinforcing insert having a front end including a foot portion and also having a rear end of an upwardly and forwardly opening shape; said insert also having an intermediate portion including a floor that extends between the front and rear ends thereof and has side edges for positioning adjacent the rocker structures at the lower extremities of the side door openings of the vehicle with the insert floor positioned above the vehicle floor pan; each insert member having a rear quarter panel that is securable to one of the rear quarter panel inner members of the vehicle; and adhesive bond connection that secures the insert members to each other; and connections that secure the insert to the vehicle floor pan.

14. In a convertible type vehicle including an occupant compartment having front and rear extremities and side door openings therebetween and said vehicle including front and rear quarter panels between which the side door openings are located, rear quarter panel inner members spaced inwardly from the rear quarter panels, rocker structures that extend between the front and rear quarter panels and define the lower extremities of the side door openings, side doors that open and close the side door openings, and a floor pan that extends between the front and rear extremities of the occupant compartment and between the rocker structures at the lower extremities of the side door openings as well as having a soft top including a frame that provides support for the soft top, the invention comprising: a reinforcing insert molded from plastic as a pair of insert members and having a shell-like construction received within the occupant compartment; said reinforcing insert having a front end including a foot portion and also having a rear end including rear quarter panels and a trunk ceiling portion that cooperate to define an upwardly and forwardly opening shape; said rear quarter panels having upper edges extending rearwardly from the side door openings; said insert also having an intermediate portion including a floor that extends between the front and rear ends of the insert and has ribs for providing strength; said floor of the intermediate portion having side edges secured to the convertible vehicle adjacent the rocker structures at the lower extremities of the side door openings with the insert floor positioned above the vehicle floor pan; each said insert rear quarter panel being securable to one of the rear quarter panel inner members of the vehicle; a central connection including an adhesive bond for connecting the insert members to each other along a longitudinal direction with respect to the convertible vehicle; and adhesive bond connections that secure the ribs to the vehicle floor pan.

15. In a convertible type vehicle including an occupant compartment having front and rear extremities and side door openings therebetween and said vehicle including front and rear quarter panels between which the side door openings are located, rear quarter panel inner members spaced inwardly from the rear quarter panels, rockers structures that extend between the front and rear quarter panels and define the lower extremities of the side door openings, side doors that open and close the side door openings, and a floor pan that extends between the front and rear extremities of the occupant compartment and between the rocker structures of the lower extremities of the side door openings as well as having a soft top including a frame that provides support for the soft top, the invention comprising: a reinforcing insert molded from plastic as a pair of insert members and having a shell-like construction received within the occupant compartment; said reinforcing insert having a front end including a foot portion and also having a rear end including rear quarter panels and a trunk ceiling portion that cooperate to define an upwardly and forwardly opening shape; said insert rear quarter panels having upper edges extending rearwardly from the side door openings and securable to the rear quarter panel inner members of the vehicle; said insert also having an intermediate portion including a floor that extends between the front and rear ends of the insert and has ribs that extend longitudinally with respect to the convertible vehicle and provide strength thereto; said floor of the intermediate portion having side edges positioned adjacent the rocker structures at the lower extremities of the side door openings with the insert floor positioned above the vehicle floor pan; a central connection including an adhesive bond for connecting the insert members to each other along a longitudinal direction with respect to the convertible vehicle; and adhesive bond connections that secure the ribs, the upper edges of the rear quarter panels, and the side edges of the floor of the insert to the vehicle.

16. In a convertible type vehicle including an occupant compartment having front and rear extremities and side door openings therebetween and said vehicle including front and rear quarter panels between which the side door openings are located, rear quarter panel inner members spaced inwardly from the rear quarter panels, rocker structures that extend between the front and rear quarter panels and define the lower extremities of the side door openings, side doors that open and close the side door openings, and a floor pan that extends between the front and rear extremities of the occupant compartment and between the rocker structures at the lower extremities of the side door openings as well as having a soft top including a frame that provides support for the soft top, the invention comprising: a reinforcing insert having a shell-like construction received within the occupant compartment and including a pair of insert members each of which is made as a resin transfer molding; said reinforcing insert having a front end including a foot portion and also having a rear end including rear quarter panels and a trunk ceiling portion that cooperate to define an upwardly and forwardly opening shape; said rear quarter panels each having holes for mounting a rear quarter window and a soft top frame of the convertible top; said insert rear quarter panels having the upper edges extending rearwardly from the side door openings and securable to the rear quarter panel inner members of the vehicle; said insert also having an intermediate portion including a floor that extends between the front and rear ends of the insert and has ribs that extend longitudinally with respect to the convertible vehicle and provide strength thereto; said floor of the intermediate portion having side edges positioned adjacent the rocker structures at the lower extremities of the side door openings with the insert floor positioned above the vehicle floor pan; a central connection including an adhesive bond for connecting the insert members to each other along a longitudinal direction with respect to the convertible vehicle; and adhesive bond connections that secure the ribs, the upper edges of the rear quarter panels, and the side edges of the floor of the insert to the vehicle.

* * * * *

UNITED STATES PATENT AND TRADEMARK OFFICE
CERTIFICATE OF CORRECTION

PATENT NO. : 5,020,846

DATED : June 4, 1991

INVENTOR(S) : Roy E. Bonnett

It is certified that error appears in the above-identified patent and that said Letters Patent is hereby corrected as shown below:

Column 5, line 48, "member" should be --members--.

Column 6, line 65, "rockier" should be --rocker--.

Column 7, line 32, "and" should be --an--.

Column 8, line 12, "rockers" should be --rocker--.

Signed and Sealed this

Twenty-fourth Day of November, 1992

Attest:

DOUGLAS B. COMER

*Attesting Officer*  *Acting Commissioner of Patents and Trademarks*